(No Model.)　　　　　　　　　　　　　　　　　　　5 Sheets—Sheet 1.
G. GRISEL & F. SEVERIO.
MATCH MAKING MACHINE.

No. 430,604.　　　　　　　　　　　　Patented June 17, 1890.

Witnesses,
Geo. H. Strong
J. H. Nourse

Inventors,
George Grisel
Frank Severio
By Dewey & Co.
Attys (No Model.) 5 Sheets—Sheet 2.

G. GRISEL & F. SEVERIO.
MATCH MAKING MACHINE.

No. 430,604. Patented June 17, 1890.

Witnesses,
Geo. H. Strong
J. H. Krouse

Inventors,
George Grisel
Frank Severio
By Dewey & Co.
attys (No Model.)  5 Sheets—Sheet 4.

G. GRISEL & F. SEVERIO.
MATCH MAKING MACHINE.

No. 430,604. Patented June 17, 1890.

(No Model.) 5 Sheets—Sheet 5.

G. GRISEL & F. SEVERIO.
MATCH MAKING MACHINE.

No. 430,604. Patented June 17, 1890.

Witnesses,
Geo. H. Strong
J. H. Muse

Inventors,
George Grisel
Frank Severio
by Dewey & Co.
attys

UNITED STATES PATENT OFFICE.

GEORGE GRISEL AND FRANK SEVERIO, OF SAN FRANCISCO, CALIFORNIA, ASSIGNORS OF ONE-THIRD TO JOSEPH D. CASE, OF SAME PLACE.

MATCH-MAKING MACHINE.

SPECIFICATION forming part of Letters Patent No. 430,604, dated June 17, 1890.

Application filed December 11, 1889. Serial No. 333,345. (No model.)

*To all whom it may concern:*

Be it known that we, GEORGE GRISEL and FRANK SEVERIO, citizens of the United States, residing in the city and county of San Francisco, State of California, have invented an Improvement in Match-Making Machines; and we hereby declare the following to be a full, clear, and exact description of the same.

Our invention relates to the class of match-making machinery; and it consists in the combinations, constructions, and arrangements hereinafter fully described, and specifically pointed out in the claims.

The object of our invention is to provide a machine which will effect continuously a series of operations briefly stated as follows: First, the mounting and holding of the splint-blocks; second, their feed upon a traveling carrier; third, the carrying forward of said blocks through a suitable heater, whereby they are dried; fourth, the dipping of said blocks in the sulphur and the eradication of the surplus sulphur by shaking and striking movements; fifth, the reduction of the temperature of the sulphur-coated blocks to a suitable point; sixth, the dipping twice of said blocks into the composition bath; seventh, the cooling again of said blocks after being dipped in the composition; eighth, the varnishing of the blocks; ninth, their discharge, and, tenth, the carrying back of the holders to the point of beginning, all of these operations being performed upon the moving blocks continuously, and each operation having certain minor operations necessary to effect the complete result of making matches.

Referring to the accompanying drawings for a more complete explanation of our invention.

A is the frame of the machine. This frame has throughout its length two separate carriers B and B', the former being mounted at the head of the machine and passing around suitable sprocket-wheels $b$, and the latter being mounted at the other end of the machine and passing around sprocket-wheels $b'$. At this point we will mention that we may, if desired, have but a single carrier, though we prefer to have two, for a purpose which will presently be stated.

Figures 1, 2, 3, 4:
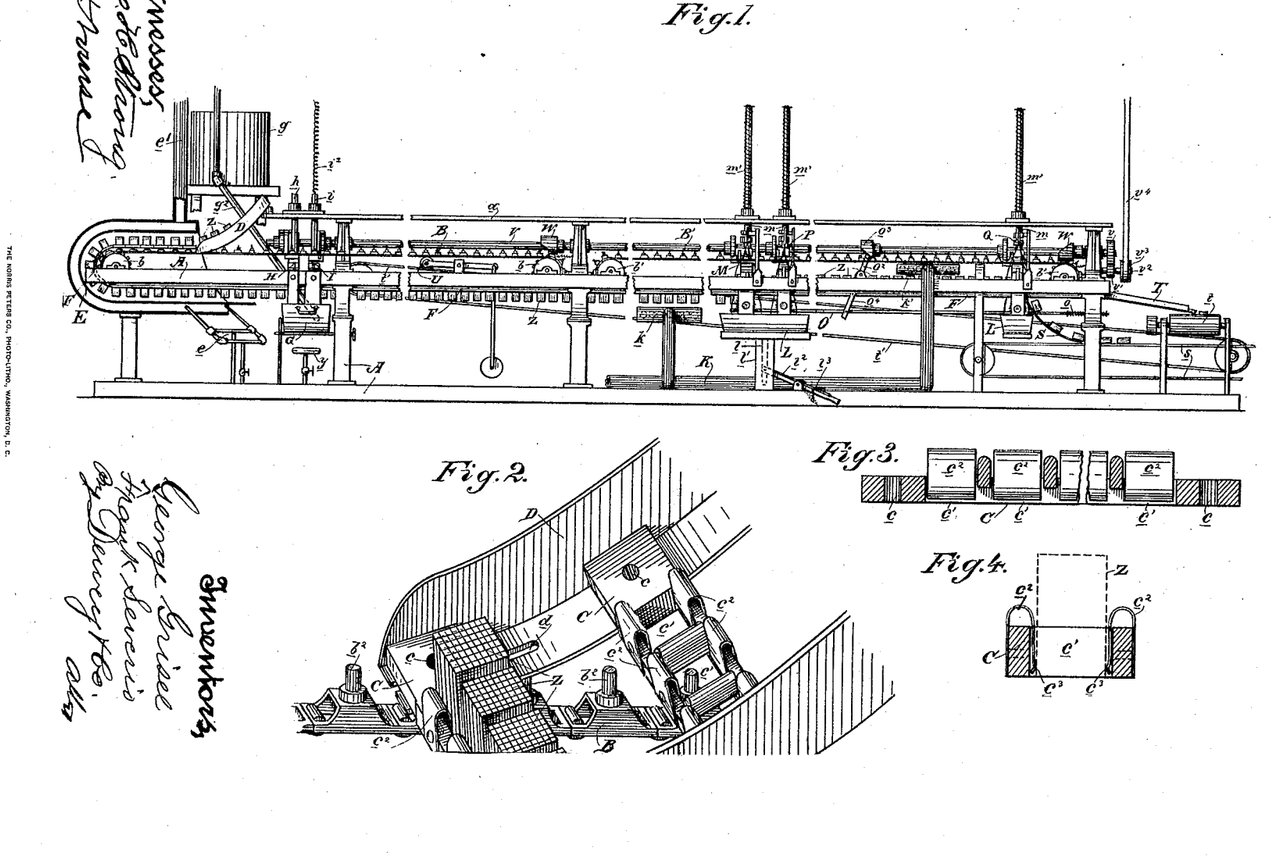
Figure 1 is a side elevation of our complete machine.
Fig. 2 is a perspective view of the feed-chute, showing the holders being directed to the traveling carrier.
Fig. 3 is a longitudinal vertical section of one of the holders.
Fig. 4 is a cross-section of the same.
Figure 5:
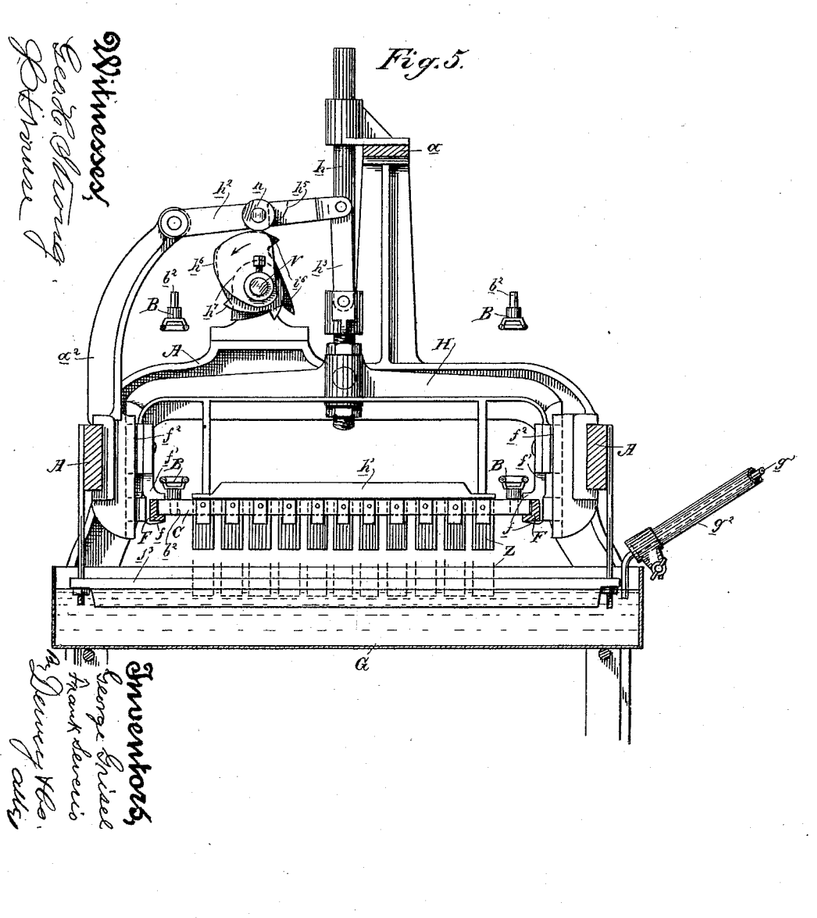
Fig. 5 is a side elevation of the mechanism for dipping the splint-blocks into the sulphur bath.
Figures 8, 9, 10, 11, 12:
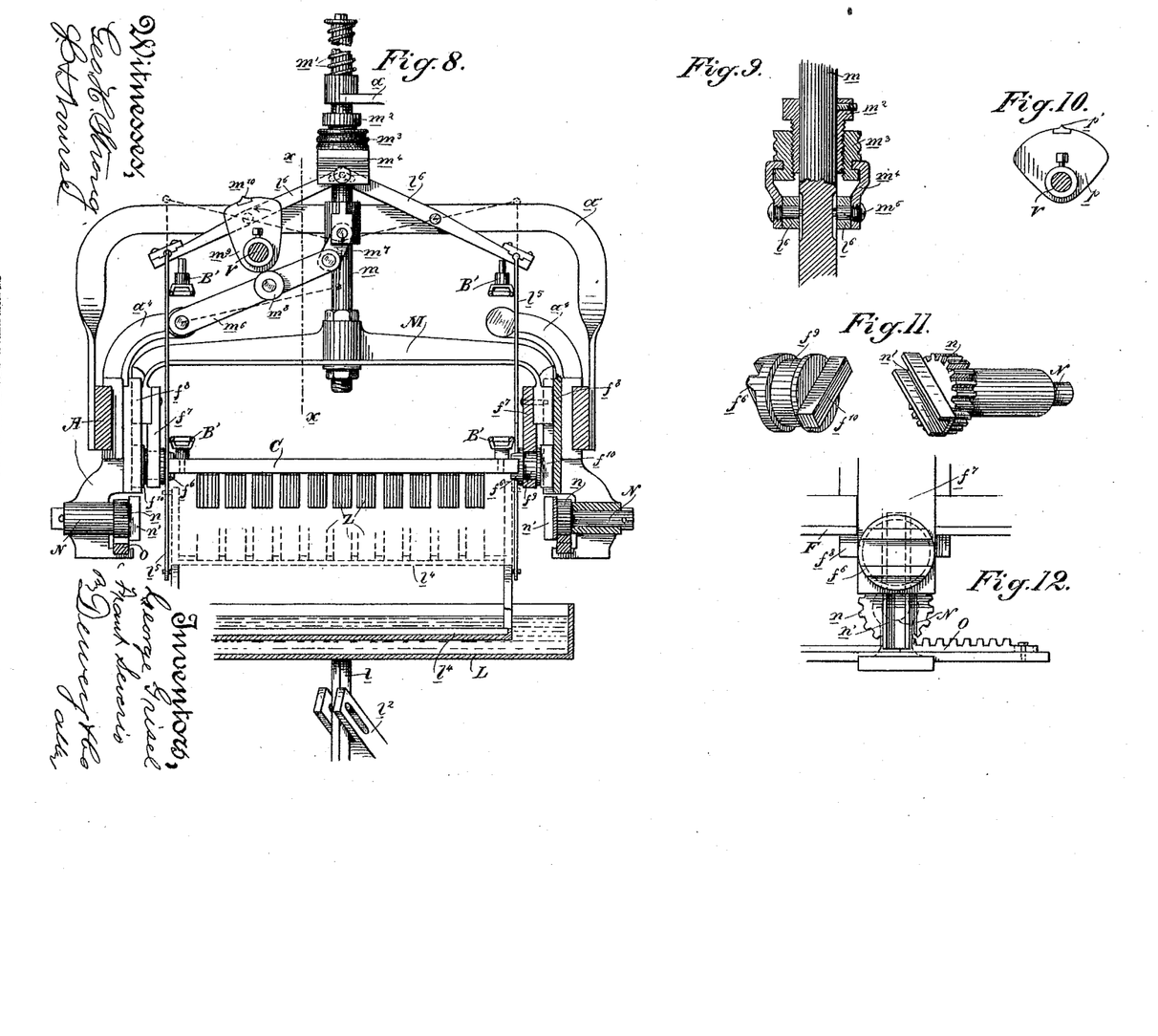
Fig. 8 is a side elevation of the mechanism for dipping the splint-blocks into the composition bath.
Fig. 9 is a detail of the adjustable connection of the trough-operating levers.
Fig. 10 is a side elevation of the cam which operates the second composition-dipping mechanism.
Fig. 11 is a perspective view showing the construction of the independent sections and the rotary part into which they fit for the purpose of turning the splint-block holders.
Fig. 12 is a side elevation of the same, showing the engagement of the rack and pinion.

Each carrier consists of two endless chains opposite and parallel with each other, one on each side of the machine, Figs. 5 and 8, said chains being made of jointed links, as shown in Fig. 2, each link having an upwardly-extending pin $b^2$.

C are the splint-block holders. The construction of these is shown in Figs. 2, 3, and 4. They consist of oblong frames having in each end a hole $c$, and their bodies composed of separated side and cross pieces, which form between them a series of sockets $c'$. (Shown clearly in Fig. 2.)

Fitted over and secured to the separated side and cross pieces are the bent springs $c^2$, which serve as clamps for holding the splint-blocks, (represented by Z,) as shown in Fig. 2. These clamps have sufficient power to hold the splint-blocks firmly when inverted, and yet permit the easy and quick loading of the holders and the discharge of the blocks at the end of the operation. The springs $c^2$ are so bent at their lower ends as to form the projections $c^3$, Fig. 4. These bind upon the splint-blocks, and are for the purpose of relieving the blocks of the full pressure of the entire surface of the springs, thereby allowing the several splints of the blocks to properly spread themselves and to be fully coated with the sulphur. If the springs clamped them fully, the splints would be bound together too compactly, whereas by the present construction they can separate properly.

The holders are mounted on the carrier B by fitting their perforated ends over the pins $b^2$ of the carrier-links, and in the first instance they are mounted upon these pins automatically by means of an inclined feed-chute D, (shown clearly in Fig. 2,) said chute, as shown in Fig. 1, being mounted upon the frame, with its lower end adapted to deliver the holders directly over the carrier.

In the lower ends of the bottom flanges of the feed-chute are made the elongated slots $d$, which lie directly in the path of the pins $b^2$ of the carrier, so that as the carrier advances the pins successively enter the slots and partially engage the holes in the holder ends, this engagement being sufficient to carry the holder off the feed-chute, whereupon it settles down fully upon said pins.

Figure 15:
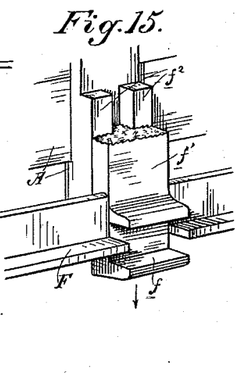
Fig. 15 is a perspective view showing one of the fixed guides F and one of the independent vertically-movable sections let into it.

Encircling the head of the machine is a hollow heating-casing E, Fig. 1, which may be heated in any suitable manner, as by means of the gas and air connection shown at $e$. This heater forms a chamber at the head of the machine, through which the carrier B passes, thus conveying successive rows of splint-blocks through it, whereby they are heated and thereby sufficiently dried. A discharge-pipe $e'$ from the heating-casing conveys away the gases. As the carrier passes around the head of the machine, the holders are of course inverted, so that the splint-blocks hang downwardly, and in order to support the holders their projecting ends travel upon fixed angle-iron guides F at each side of and extending the whole length of the machine. A portion of one of these guides is shown in Fig. 15.

Under the machine near its head and properly supported from its frame is the vessel or pan G, said pan being supplied with molten sulphur from a receptacle $g$ above, which may be located in any convenient position and heated in any suitable way. A pipe $g'$ connects said receptacle with the sulphur-pan G, and around said pipe is fitted a steam-jacket $g^2$, (shown in Fig. 5,) whereby the sulphur in its passage to the pan is kept in a molten condition. A burner $y$ is located under pan G to keep the sulphur in a liquid condition.

The angle-iron guides F, heretofore referred to, although extending the entire length of the sides of the frame A, are not unbroken or continuous. The first break occurs at a point on each side over the sulphur-pan, where short sections $f$ are wholly independent of them, but lie in line with them. Such a section is well shown in Fig. 15, the section being shown, however, as depressed below the guide in order to illustrate its vertical movement. These sections, which are in the shape of channel-irons, are connected with stems $f'$, which are mounted and adapted to move vertically in guides $f^2$, secured to the sides of the main frame. This is shown in Fig. 5. The stems of the short sections $f$ are secured to or form part of a vertically-movable cross-frame H, the top of which is provided with a vertical guide-rod $h$, extending upwardly through a guide-rail $a$, supported from the main frame. The frame H has a cross-base $h'$, (shown in Figs. 5 and 6,) which bears upon the bottoms of the inverted splint-blocks.

Figure 6:
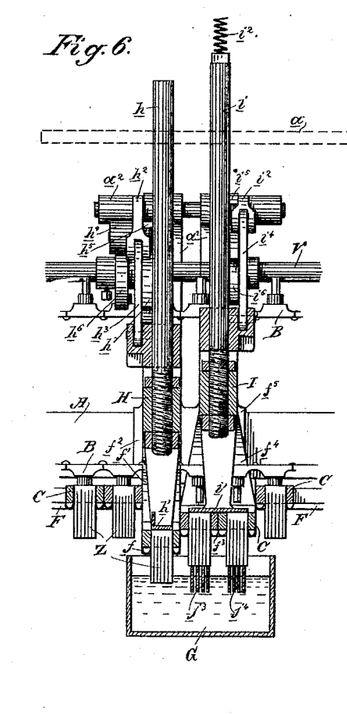
Fig. 6 is a cross-section of the same.

A vertical movement of a character to be presently described is given to the cross-frame H to effect the following operation: When by the movement of the carrier B a holder C, with its contained inverted splint-blocks, arrives above the sulphur-bath pan G, the ends of the holder pass from the main portion of the guides F onto the independent short sections $f$ thereof. This is shown in Figs. 5 and 6. Thereupon the cross-frame H is moved downwardly, carrying the short sections $f$ with it, and thereby carrying downwardly from the carrier-pins $b^2$ the holder C with its blocks, and by this movement, as shown by the dotted lines in Fig. 5 and as shown in Fig. 6, the blocks are dipped a sufficient distance into the sulphur bath. Then the cross-frame H rises, and when the blocks are free of the sulphur bath the frame is given a sudden shake due to the peculiar cam to be hereinafter described, whereby the surplus sulphur, or a portion of it, is shaken off the blocks, and then upon the full rise of the frame the holder C is brought up to the level of the main portions of the guides F and passes on by the movement of the carrier B, with the pins $b^2$, of which it again engages. The guides F are immediately again broken into short sections $f^3$, Fig. 6, and similar to section in Fig. 15, which are long enough to receive at the same time two of the block-holders, as is shown in said figure. These sections have stems $f^4$, mounted and adapted to slide in guides $f^5$, said stems being secured to or connected with a second cross-frame I, having in its top a guide-rod $i$, passing through the guide-rail $a$ and having a spring $i^2$ connected with its top.

A cross-foot $i'$ is connected or formed with the frame I, which bears upon the bottoms of the inverted splint-blocks and holds them against the force of the blow now to be described. Mounted longitudinally in the sulphur-pan G is a fixed bar $j^3$, the top of which may be corrugated, roughened, or toothed, and a second fixed bar $j^4$, both bars consisting of a number of separated plates. The tops of both of these bars, as shown in Fig. 6, are above the level of the sulpur in the pan.

Figure 7:
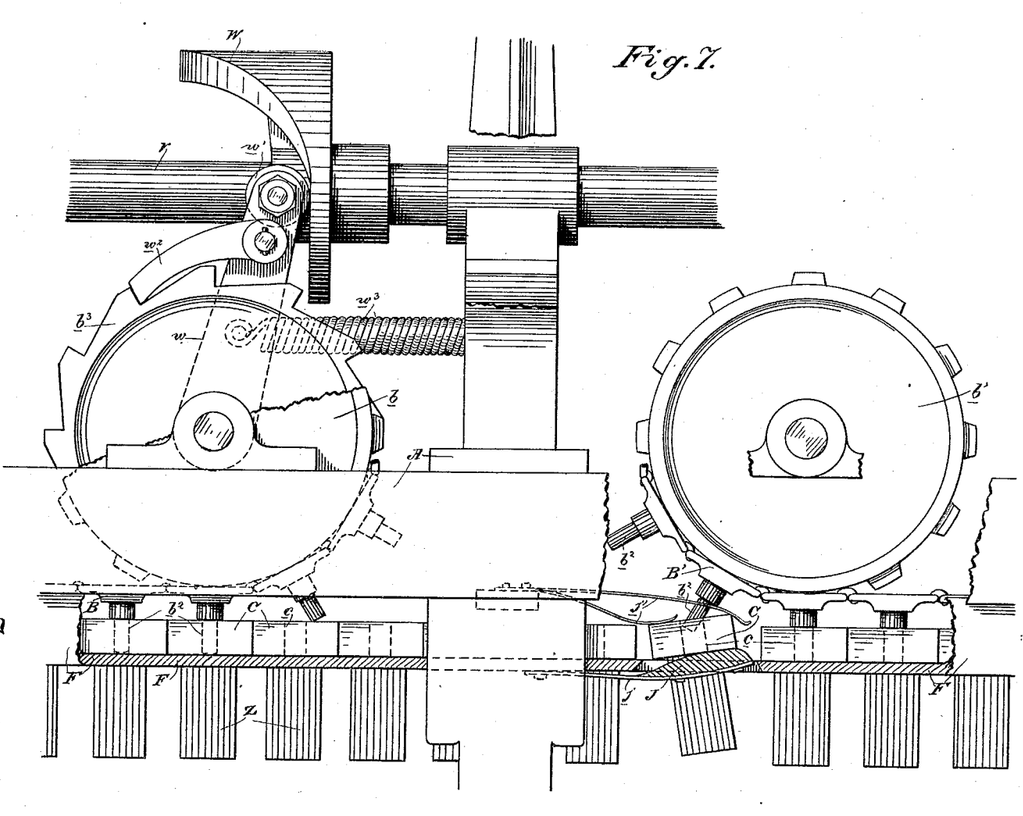
Fig. 7 is a side elevation showing the adjoining ends of the two carriers, and also the cam and pawl and ratchet for driving one of the carriers.

The operation taken up again is as follows: The holder C, after being dipped in the bath, as heretofore described, and passed on by the movement of the carrier, immediately comes upon the second independent short sections $f^3$, and by the downward movement of the cross-frame I the said sections, with the holder, are moved downwardly, so that the lower ends of the blocks are brought into striking contact with the bar $j^3$, whereby more of the surplus sulphur is shaken off the blocks and drops freely through the bar into the pan. Then the frame I rises again and the carrier moves one step forward, carrying the holder forwardly and bringing a second holder upon the same short sections $f^3$, so that two holders are now upon said sections. Then the frame I descends again, and the blocks of the first holder are brought into contact with the top of the second fixed bar $j^4$, which is leveled up with accuracy, so that the blocks, in addition to having more of the surplus sulphur shaken off, are trued and leveled in their holders by their contact with the leveled bar, while the second series of blocks have their surplus sulphur shaken off by the first fixed bar, the toothed surface of which adds to this result. This leveling of the blocks is essential in order to cause them to dip evenly in the composition bath hereinafter described. After passing the second independent sections $f^3$ the holder moves upon the main guides F again, and so travels forwardly to the end of the first carrier B, where the pins $b^2$ leave it, as shown in Fig. 7, as they turn upwardly with the carrier on its return. Now to cross the space between the end of carrier B and the beginning of carrier B' the holders are pushed over one by the other on the guides F, Fig. 7—that is to say, a holder behind pushes a holder in front until the first one reaches the pins $b^2$ of the second carrier. At this point there is a novel detail of construction. (Shown in Fig. 7.) There are let into the guides F—one on each side—a separate section or piece J, which slightly tilts the holders. This tilting piece is carried by a spring-shank $j$, and there are holding-springs $j'$ above, which bear on the holder and steady it. Now as a holder reaches this piece J, which is held normally slightly inclined, as shown, said holder is tilted so as to incline its holes $c$ backwardly, thereby presenting themselves for the better engagement of the carrier-pins $b^2$. Then as the engagement takes place and the holder is carried forward the tilting piece yields, so that the holder passes smoothly over onto the continuations of the guides F. At this point may be mentioned the object of having two carriers—such as B and B'—instead of a single one. The carrier passing through the heater E at the head of the machine and out again is subject to such variations of temperature as to effect its adjustment. In a long carrier this would be more inconvenient than in a shorter one, and by having two one is not liable to this disadvantage, while the effect on the other is not of great importance. Having two carriers, as described, we operate them alternately, so that the first one shall push a holder into position and then the second one shall pick it up. This will again be referred to.

Under the machine, at a point near the beginning of the second carrier B', is a series of perforated air-pipes $k$, Fig. 1, serving as a cooler by being arranged to direct air upon the blocks as the latter pass over. This cooler is supplied by a pipe K, which may be supposed to extend from any suitable blower or air source. The object of this is to reduce the temperature of the blocks before they are dipped into the composition. This composition is in a pan or dish L, which is supported by a standard $l$, Fig. 8, mounted between suitable guides $l'$, Fig. 1, and adapted to be vertically adjusted by a lever $l^2$, which may be held in place by a hook $l^3$.

Figure 13:
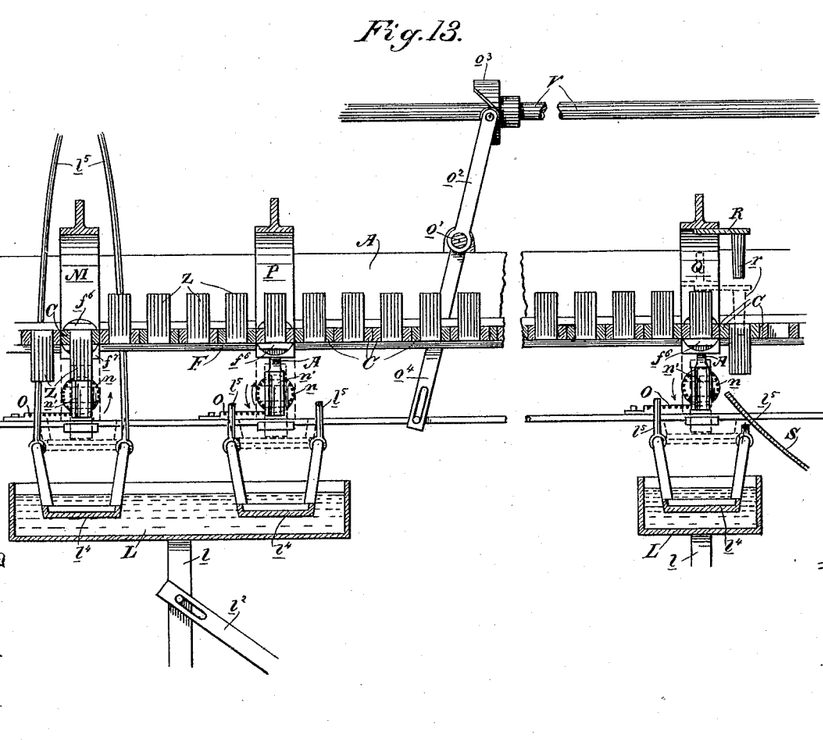
Fig. 13 is a section on the line $x\, x$ of Fig. 8.

Let into the main or fixed guides F are the third short independent sections $f^6$, Fig. 8. These are similar to the first and second short sections $f$ and $f^3$, heretofore described. These sections are carried by stems $f^7$, mounted in guides $f^8$, and carried by a third cross-frame M, having an upwardly-extending guide-rod $m$, and provided with a spring $m'$, said guide-rod being vertically movable in the guide-rail $a$, secured to the main frame. The cross-frame M is adapted to be vertically moved so as to carry the short sections $f^6$ downwardly, whereby the splint-block holder is lowered and its splint-blocks dipped into the composition. This dipping, however, does not take place in the main pan L, but in a shallow trough $l^4$, Figs. 8 and 13, adapted to work up and down in the pan. This trough is suspended by hangers $l^5$, connected with its side arms, Fig. 13, and having their upper ends attached to levers $l^6$, which are pivoted to a fixed cross-bracket $a'$, as shown in Fig. 8, and their inner ends are secured to the guide-rod $m$ of the cross-frame M in the manner shown in Fig. 9, and presently to be described. In consequence of this construction, as the cross-frame moves downwardly the trough $l^4$ moves upwardly, and carries with it a small but sufficient depth of composition liquid in it, so that the splint-blocks, being dipped into this trough, are coated only with the required amount of composition.

The adjustable connection shown in Fig. 9 is for the purpose of accurately adjusting and regulating the relative position of the trough $l^4$ with the vertically-movable cross-frame above, so as to nicely regulate the dipping of the splint-blocks. This connection is formed by an externally-threaded sleeve $m^2$, secured upon the guide-rod $m$. Upon this sleeve is screwed a nut $m^3$, having fitted in a groove in its lower end the side plates or flanges $m^4$, between the lower ends of which and the guide-rod are pivoted the levers $l^6$ upon pins $m^5$, the inner ends of which enter grooves in the guide-rod, whereby the parts are steadied and held in position. Now by turning the nut $m^3$ the position of the levers $l^6$ may be varied to regulate the relative position of the trough $l^4$. Up to this point the splint-blocks have been carried along, as shown in Fig. 1, in an inverted position, and their first dipping into the composition is still in an inverted position, as shown in Fig. 8; but immediately after being dipped into the composition we give the splint-blocks a half-turn, so as to throw them to an upright position, the object of which is to let them travel in that position, so as to allow the composition to set better and more perfectly coat the ends of the splints. This half-turn is accomplished as follows: By referring to Figs. 8 and 11 it will be seen that the independent sections $f^6$ are supported in their stems $f^7$ by a rotary connection being formed for this purpose with a journal portion $f^9$, Fig. 11, and the back of said portion being provided with a lug $f^{10}$, which is mounted and adapted to slide in suitable guides in the main frame, Fig. 8. The sides of the main frame, as shown in Fig. 8, are carried downwardly, and in their lower ends is mounted a shaft N, having on its inner end a pinion $n$, the face of which is provided with a channel-guide $n'$, Fig. 11, and which normally stands in a vertical position in the line of the lug $f^{10}$, which is thereby adapted to descend into it, thus forming a temporary clutch. The lower portion of the frame also forms a bed or support for the sliding rack O, which engages the pinion $n$, as shown in Fig. 12. By the movement of this rack the pinion is rotated, and as the lug $f^{10}$ of the section $f^6$ is then in the channel-guide $n'$ of the pinion $n$ said section is rotated through a half-turn, thereby turning the splint-block holder and its contained blocks, so that the latter assume an upright position and thereafter immediately are raised by the upward movement of the cross-frame M. The holder is then in line again with the main guides F and is advanced on said guides by the movement of the carrier. Now, as shown in Fig. 1, there is a second dipping mechanism. (Represented in said figure generally by P.) We have not herein deemed it necessary to illustrate in detail all the parts of this mechanism, it being sufficient to say that there is an equivalent part in said mechanism for every part in the first dipping mechanism. We have, however, shown some of these parts in Fig. 13, wherein they bear letters similar to the corresponding parts of the first mechanism. The only change is having to turn the splint-blocks down from an upright position to dip them and then turn them up again, thus involving one more movement than the first dipping mechanism. This movement, however, is due wholly to the cam which operates the second mechanism, said cam being shown in Fig. 10, and presently to be described. The same rack-bar O operates the pinion of the second mechanism; but by reason of the shape of the cam the operation takes place both on the forward and back movement of the rack, thereby making two movements of the splint-block holders, whereas the first mechanism only operates on one movement of the rack, as will be hereinafter explained. The holders now move off and travel along on the main guides F, being advanced by the carrier B' until they reach the varnishing dipping mechanism, which is shown in Fig. 1 and is designated generally by Q. It is not necessary to describe in detail the parts of this mechanism, as they are the counterpart of the first composition-dipping mechanism, the only difference being that instead of composition in the underlying pan there is placed a varnish such as is usually applied to the heads of matches. Some of this mechanism we show in Fig. 13, and the parts are similarly lettered. In this mechanism the splint-blocks, which have now become match-blocks, are received in an upright position, carried downwardly, inverted, dipped into the varnish, and lifted to the level of the main guides F again. Attached to the cross-frame of the varnishing mechanism is an arm R, provided with downwardly-extending pins $r$, which are adapted to come down onto the bottoms of the inverted match-blocks in their holders and force them downwardly out of said holders. The holders at this time are supported upon the main fixed guides F, so that the match-blocks are readily pushed out of them. The blocks fall upon an inclined chute S, Fig. 1, by which they are discharged upon a traveling belt $s$, which carries them off to a convenient point. The holders still travel along until they reach the end of the carrier B', where the pins $b^2$ leave them, and they are pushed by one another successively onto an inclined chute T, by which they are delivered onto a cross-belt $t$, which delivers them in turn upon a traveling belt $t'$, extending to the head of the machine, as shown in Fig. 1, and by which said holders are carried to convenient position to be filled up and placed once more in the feed-chute D. The supply-pipe K, by which air is delivered to the first cooler $k$, is extended, as shown in Fig. 1, and is connected with a second cooler $k'$, located above the match-blocks after they have been dipped in the composition bath, whereby their temperature is again reduced before being varnished.

U, in Fig. 1, is a simple tightening mechanism acting on the carrier B to take up the slack due to expansion and contraction as said carrier passes through the heater.

Having now described the several operating parts of our machine, we will proceed to the description of the mechanisms by which they are actuated. The two carriers B and B' are, as before stated, driven alternately.

The motion of each is an intermittent one, and while one is moving the other is still. The motion of both is effected from a single power-shaft V, extending longitudinally of the frame of the machine, as shown in Fig. 1. Upon its end is a pinion $v$, which meshes with a second pinion $v'$ on a counter-shaft $v^3$, having a pulley $v^3$, to which the driving-belt $v^4$ runs. Upon the shaft of the sprocket-pulleys $b$ of carrier B is a ratchet-wheel $b^3$, (shown in Fig. 7,) and a similar wheel is on the sprocket-pulley shaft or carrier B′, though we have not here shown it, it being exactly like the one shown in Fig. 7, and its position and operation being evident from the position of the cams in Fig. 1 These cams (designated by W) are fast on the power-shaft, and are located one near the end of carrier B and the other near the end of carrier B′. They are of the shape shown in Fig. 7, but relatively so arranged that when one is acting to move its carrier the other is so acting as to let its carrier remain stationary. The intervening mechanism by which the cams act is shown in Fig. 7. A swinging pawl-carrier $w$ is mounted on the sprocket-wheel shaft, and has in its upper end an anti-friction roller $w'$ impinging on the cam. The pawl $w^2$ of said carrier engages the ratchet-wheel $b^3$ and moves it forwardly, and said pawl is retracted by a spring $w^3$, connected with its carrier. The intermittent motion of the carrier gives time for the dipping operations of the blocks.

Referring now to Figs. 5 and 6, we will describe the means for operating the cross-frames H and I, by which the splint-blocks are dipped in the sulphur bath: First, with regard to the cross-frame H. Rising from the side of the main frame, Fig. 5, is a bracket $a^2$, in the top of which is pivoted a lever-arm $h^2$, the end of which is connected by a link $h^3$ with the vertical guide-rod $h$ of the cross-frame H. Upon one side of this lever-arm is an anti-friction roller $h^4$, and on the other side is a projecting lug $h^5$. Upon the longitudinal power-shaft V is mounted rigidly a cam $h^6$, of the shape shown in said figure. In the position shown this cam, acting under the anti-friction roller $h^4$, holds the cross-frame H up to its highest position. The cam moves in the direction shown by the arrow, whereby it will be seen that in a moment the cross-frame will be allowed to drop along the straight side of the cam, and this movement carries the splint-blocks down, so that they are dipped in the sulphur bath. On the power-shaft adjacent to the first cam is a second cam $h^7$, so arranged as to act under the lug $h^5$ on the other side of the lever-arm $h^2$ and to produce its effect just after the splint-blocks are dipped. This effect is to slightly raise the cross-frame and immediately to let it drop off the first point of the cam, whereby a sufficiently vigorous shake is given to the splint-blocks. Then the cam raises the holder again and drops it off its second point, giving it a second shake, and then the first cam $h^6$ comes into action again to raise the cross-frame to its elevated position and hold it thus, so that the holder engages the carrier-pins and lies in line with the main guides F. With regard to the cross-frame I, there is a similar bracket $a^3$ on the main frame, in the upper end of which is carried a lever-arm $i^2$, (shown in Fig. 6,) the upper end of which is connected by a link $i^4$ with the vertical guide-rod $i$ of said cross-frame. On one side of the lever-arm is a contact-lug $i^5$. On the power-shaft V is a cam $i^6$, the shape of which is shown in Fig. 5. This cam has three points, and, as shown in the position of Fig. 5, it is holding its frame up to its highest limit. Then the cam drops it off the first point, so that the splint-blocks fall down into contact with the fixed bars $j^3$ and $j^4$ in the sulphur-pan, and this fall and contact is accomplished three times by this cam before it again raises the frame to its highest limit. The spring $i^2$ is for the purpose of easing up the jar of the contact.

The mechanism for operating the cross-frame M is shown in Fig. 8, and consists of a lever $m^6$, pivoted to a bracket $a^4$ of the main frame, and having its inner end connected by a link $m^7$ with the guide-rod $m$ of said frame. The lever carries a roller $m^8$, upon which impinges a cam $m^9$ on the power-shaft V. This cam has the shape shown in Fig. 8, and is adapted to force down the cross-frame and allow it to rise again under the power of the spring $m'$. One peculiarity of the cam $m^9$, to which we call attention, is the small projection $m^{10}$ on its top. The main body of the cam forces the parts down to such a position that the splint-blocks come nearly to the surface of the composition liquid in trough $l^4$. Then the projection $m^{10}$ acts and quickly dips the blocks into the composition and immediately allows them to rise out of it. For the cross-frame P (shown in Fig. 13) a similar mechanism is used, consisting of a lever and a link (unnecessary to show) and a cam $p$ on the power-shaft. The cam $p$, which is shown in Fig. 10, has a slightly-different contour in order to provide for holding down frame P momentarily, in order to give time for the second operation of the rack O; but said cam has a projection $p'$ corresponding to the projection $m^{10}$ of cam $m^9$ and for the same purpose. The rack O extends to the foot of the machine, and is there provided with a propelling-spring $o$, Fig. 1. The rack is operated by the mechanism shown in Figs. 1 and 13. Upon the frame A is mounted a rock-shaft $o'$, from which an arm $o^2$ extends upwardly and is acted upon by a cam $o^3$ on the power-shaft V. From each end of this rock-shaft depends an arm $o^4$, which is connected with the rack O, one on each side. Now by the action of the cam the arm $o^2$ is moved forwardly, thereby throwing the arms $o^4$ backwardly and moving the rack back, compressing its spring $o$. This movement of the rack turns the holder C in the cross-frame M forwardly and upwardly through a half-turn, so as to up-end its splint-blocks. The same movement turns the holder in frame P backwardly and downwardly, so as to invert its blocks to be immediately dipped. The cam $m^9$ of the frame M now immediately raises said frame and all its parts, so that the sections $f^6$ are lifted from the turning clutch mechanism; but the cam $p$ of frame P holds said frame down temporarily, so that when the rack, relieved of the action of cam $o^3$, moves forwardly again, under the power of its spring, it will act to return the holder in frame P, thereby up-ending its blocks.

Figure 14:
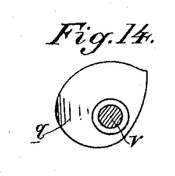
Fig. 14 is a cam for operating the cross-frame of the varnishing mechanism.

The cross-frame Q is operated by similar mechanism to that shown for operating cross-frame M—namely, a lever and a link (unnecessary to show) and a cam $q$ on the power-shaft V, said cam being shown in Fig. 14 and so shaped as to force the frame down and hold it for a single action of the rack O, which serves to invert the match-blocks, so that they may be dipped in the varnish; but they are raised before the rack can act on them again, whereby they are advanced in an inverted position, ready to be pushed out of their holders by the points or pins $r$ of the discharge-arm R.

Having described the various parts of our machine and the details of operation of each, it may be well to now enter upon a more extended and connected description of the entire operation. This description will be better understood by referring to Fig. 1, which shows the general and relative arrangement of all the parts of the machine.

Block-matches are those which are formed by cutting up blocks into a number of splints, all holding together at their base by means of a battered web of the wood or other means. These blocks are cut into splints in the ordinary manner by the use of knives, which cut them first one way and then the other. In the ordinary operation of making matches these blocks are then put away in the drying-room until they are thoroughly dried, which takes several weeks. The dried blocks are then taken out and are dipped by hand into the molten sulphur, this dipping operation taking place with accompanying knockings of the block upon a fixed surface to shake off the surplus sulphur. The blocks are then taken by the workmen, who dip them into the composition bath, this dipping being a double one, after which they are varnished with a brush to remove as much as possible the odor. These large blocks are then divided into small blocks containing a hundred splints or matches each, and after being divided are wrapped in paper. This entire operation is done by hand, no machinery being used except that which cuts the blocks into splints.

Our machine is adapted to handle blocks of any size desired, and for convenience we have shown these blocks in Fig. 1, but more especially in Fig. 2, as the small blocks. The operator, standing near the head of the machine, takes these blocks and fills the holders C with them, and then places said holders in the feed-chute D, on which they slide down and are engaged by the pins $b^2$ of the traveling carrier. The carrier, as before stated, has an intermittent motion, which in time carries the blocks successively through the drier at the head of the machine, whereby they are sufficiently dried. As they turn around the head of the machine they assume an inverted position, as shown in Fig. 1, and are supported in this position, not by the carrier, but by the fixed guides F, on which their ends are supported. The carrier acts to advance them on the guides. When they reach the sulphur bath and come successively upon the independent sections $f$ of the guides F, they are moved down with said sections, so that the ends of the blocks are dipped into the sulphur. They are then raised slightly and shaken to shake off the surplus sulphur, and rising again to the level of the guides F are advanced one position. When reaching the second independent section, they are again lowered and come in contact with the fixed bars in the pan, whereby the remaining surplus sulphur is knocked off. This contact takes place twice, the second one serving to level the blocks up in the holders, so that they shall dip squarely into the composition bath when they reach it. The holders continue to advance until they are transferred from one carrier B to the other carrier B', as heretofore described, and shortly after meeting with the cooling effect of the air-pipes the temperature of the blocks is sufficiently reduced to permit them to be dipped into the composition bath. When they reach this bath, they pass upon the independent sections of the guides and are lowered, being still in an inverted position. At the same time the shallow trough rises to meet them, and the ends of the blocks are thereby dipped accurately into the composition in the trough. Immediately upon rising from the trough the holders are reversed so as to up-end the match-blocks, it being better to carry them in this position to allow the composition to set better. They then reach the second dipping mechanism, by which they are again dipped into the composition, this time being inverted and up-ended again. They then proceed upon the guides F until they come under the second cooling-pipes, whereby their temperature is again reduced, and finally they reach the varnishing dipping mechanism, by which they are coated with varnish. The blocks are now in an inverted position, and are easily pushed out of the holders by the pins $r$, so that they drop upon the chute S and are carried away, while the holders themselves pass on to the end of the machine and are returned by the endless belts to the head of the machine, where the operator stands ready to reload them with the splint-blocks.

We do not confine ourselves to the making with this machine of the ordinary sulphur match, as we may make other forms of matches with it.

Having thus described our invention, what we claim as new, and desire to secure by Letters Patent, is—

1. In a match-making machine, the combination of socketed holders having spring-plates for holding the blocks in place, and an endless carrier consisting of pivoted links having pins engaging the holders, substantially as described.

2. In a match-making machine, the combination of the splint-block holders C, having a hole in each end, and the traveling carrier consisting of side chains, the links of which have pins $b^2$ engaging the holes of the holders, substantially as herein described.

3. In a match-making machine, the traveling carrier consisting of chains, the links of which have the pins $b^2$, and the holders C for the splint-blocks, having holes in their ends for engaging the pins, in combination with the inclined chute D, by which the holders are fed down onto the carrier, substantially as herein described.

4. In a match-making machine, the traveling carrier consisting of side chains, the links of which have pins $b^2$, and the splint-block holders C, having holes in each end for engaging the pins of the carrier, in combination with the inclined flanged feed-chute D for the holders, having slots in its lower end over which the holder ends pass, and through which the pins of the carrier play, whereby they automatically engage the holders, substantially as herein described.

5. In a match-making machine, the traveling carrier consisting of side chains passing over suitable end sprocket-wheels and having their links provided with pins $b^2$, holders for the splint-blocks mounted upon said carrier and having holes therein for said pins, in combination with the fixed guides F, on which the ends of the holders travel, and are supported along the under side of the carrier, substantially as herein described.

6. In a match-making machine, the traveling carrier consisting of side chains, the links of which have the pins $b^2$, and the splint-block holders C, having holes in each end fitting over the pins, in combination with the fixed guides F, on which the ends of the holders travel, and are supported along the under side of the carrier, substantially as herein described.

7. In a match-making machine, the combination of the endless carrier consisting of side chains, the links of which have pins $b^2$, the splint-block holders having holes therein for receiving the pins of the carrier, whereby said holders are carried upon and advanced by said chains, the hollow casing encircling the head of the chains and through which the holders are carried, and the heating-pipes applied to said casing, whereby the splint-blocks are dried, substantially as herein described.

8. In a match-making machine, the fixed guides F, and independent sections let into said guides and vertically movable, in combination with splint-block holders supported upon said guides and having holes, a traveling carrier having its links provided with pins engaging the holes in said holders for advancing the holders on the guides and onto the independent sections thereof, whereby when on said sections said holders may be lowered and raised, substantially as herein described.

9. In a match-making machine, the fixed guides F, independent vertically-movable sections let into said guides, and a pan or receptacle below said sections, in combination with a carrier having pins, splint-block holders having holes for said pins and supported and traveling on the guides, whereby when they are moved onto the sections they may be lowered into the underlying pan or receptacle and raised again, substantially as herein described.

10. In a match-making machine, the fixed guides F, having the vertically-movable independent sections let into them, and an underlying pan or receptacle below said sections, in combination with the traveling carrier consisting of side chains, the links of which have the pins $b^2$, and the splint-block holders having holes in their ends engaging the pins of the carrier, said holders being supported and traveling upon the guides and their independent sections, whereby when on the latter they may be lowered from the pins of the carrier into the underlying pan or receptacle and raised again to said pins whereby they are advanced, substantially as herein described.

11. In a match-making machine, the fixed guides F, having the independent vertically-movable sections let into them, the underlying pan or receptacle for containing sulphur, the sulphur-supply receptacle, and the steam-jacketed pipe connecting said receptacle with the pan, in combination with the traveling carrier, and splint-block holders advanced by said carrier and traveling on the guides and their independent sections, whereby when on the latter they may be lowered onto the sulphur-pan and raised again, substantially as herein described.

12. In a match-making machine, the fixed guides F, having the vertically-movable independent sections let into them, a frame supporting said sections, and power mechanism for raising and lowering the frame to move the sections up and down, in combination with the traveling carrier having pins $b^2$, and splint-block holders having holes formed therein for said pins, said holders being thereby advanced by said carrier and traveling on the fixed guides and on the independent sections, whereby when on the latter they may be lowered and raised, substantially as herein described.

13. In a match-making machine, the movable independent guide-sections, the traveling carrier and splint-block holders adapted to be moved upon said independent sections, and the underlying sulphur-pan, in combination with the frame carrying said sections and having a vertical guide-rod, the pivoted lever, and the link connecting the lever with the guide-rod, the power-shaft V, and the cam on said shaft operating under the lever for raising and lowering the frame, whereby the splint-blocks are dipped in the sulphur bath, substantially as herein described.

14. In a match-making machine, the movable independent guide-sections, the splint-block holders thereon, and the sulphur-bath pan underneath, in combination with the cross-frame carrying the guide-sections and having a vertical guide-rod, the pivoted lever, and the link connecting the said lever with the rod, a rotary power-shaft V, and the cams $h^6$ and $h^7$ on the shaft, operating under the lever for lowering the frame and alternately raising and dropping it to shake the splint-blocks, substantially as herein described.

15. In a match-making machine, the vertically-movable guide-sections and the splint-block holders thereon, in combination with the sulphur-bath pan below, and the fixed contact-bar $j^3$ in said pan, against which the splint-blocks are adapted to come in contact to shake off the surplus sulphur, substantially as herein described.

16. In a match-making machine, the combination of the vertically-movable guide-sections and the splint-block holders carried thereby, the underlying sulphur-pan, and the leveling-bar $j^4$ in said pan, against which the splint-blocks are brought in contact to even them up in their holders, substantially as herein described.

17. In a match-making machine, the vertically-movable independent guide-sections, the splint-block holders carried thereby, and the underlying sulphur-bath pan, in combination with fixed contact-bars $j^3$ and $j^4$ in said pan, and the mechanism for raising and lowering the guide-sections, consisting of the cross-frame I, with which they are connected, having a vertical guide-rod, a pivoted lever and a link connecting it with said rod, a power-shaft V, and a pointed cam $i^6$, carried by the shaft and operating under the lever to drop the splint-blocks successively into contact with the bars in the pan, substantially as herein described.

18. In a match-making machine, the endless carrier, the splint-block holders carried thereby, the fixed guides F, on which the ends of the holders travel and are supported, and the independent sections let into said guides for receiving the holders, in combination with the underlying sulphur-bath pan, the contact-bars in said pan, the cross-frames H and I, carrying the independent sections of the guides, said frames having vertical guide-rods, the pivoted levers and the links connecting said levers with the guide-rods, the power-shaft V, and the three cams on said shaft operating on the levers for dipping the match-blocks into the sulphur bath, shaking them as they rise and bringing them successively into contact with the bars in the pan, substantially as herein described.

19. In a match-making machine, the endless carrier consisting of side chains passing over sprocket-pulleys at each end, in combination with the means for imparting an intermittent motion to said carrier, consisting of the ratchet-wheel on the sprocket-pulley shaft, the power-shaft V, having the cam W, the swinging spring-controlled pawl-carrier, and the pawl thereof engaging the ratchet, substantially as herein described.

20. In a match-making machine, the combination of independent carriers having pins for engaging and advancing the splint-blocks, said carriers having each an intermittent travel, the movement of one alternating with that of the other, substantially as herein described.

21. In a match-making machine, the combination of independent intermittently-moving carriers in line with each other and each provided with pins $b^2$, splint-block holders engaged and advanced by said carriers, and fixed guides on which the holders are advanced from one carrier to the other, substantially as herein described.

22. In a match-making machine, the combination of the independent endless carriers B and B′, having the pins $b^2$, the splint-block holders having holes engaging said pins, whereby they are advanced, and the fixed guides F, upon which the holders are supported and by which they are transferred from the end of one carrier to the beginning of the other, substantially as herein described.

23. In a match-making machine, the combination of the independent intermittently and alternately traveling carriers B and B′, consisting of side chains, the links of which have pins $b^2$, the splint-block holders having holes in their ends engaging the pins of the carriers, and the fixed guides F, on which said holders travel under the carriers and are transferred from the pins of one carrier to those of the other, substantially as herein described.

24. In a match-making machine, the fixed guides F and the traveling splint-block holders supported thereon, in combination with the carrier B′, having the pins in its links adapted to engage holes in the splint-block holders, and the yielding spring-controlled sections J of said guides for tilting the holders to better present their holes to the engagement of the carrier-pins, substantially as herein described.

25. In a match-making machine, the combination of the carrier consisting of endless side chains, the sprocket-pulleys on which they are mounted, the ratchet-wheel on the sprocket-pulley shaft, the power-shaft V, the cam W, the spring-controlled pawl-carrier, and the pawl thereof engaging the ratchet, substantially as herein described.

26. In a match-making machine, the combination of the independent carriers B and B', the sprocket-pulleys over which they travel, the single longitudinal power-shaft V, the ratchet-wheels on the sprocket-pulley shafts, the pawl-carriers, the pawls thereof engaging the ratchet-wheels, and the cams W on the power-shaft operating against the pawl-carriers and so arranged with relation to one another as to operate the carriers alternately, substantially as herein described.

27. In a match-making machine, the traveling carrier having links provided with pins and the splint-block holders having holes therein for said pins, whereby said holders are moved, in combination with air-blower pipes adapted to direct cool air onto the splint-blocks, substantially as herein described.

28. In a match-making machine, the endless carrier having links provided with pins, the splint-block holders having holes therein for said pins, whereby the holders are moved, and a sulphur-bath pan and means for dipping the splint-blocks therein, in combination with air-pipes adapted to direct cool air upon the splint-blocks after being dipped in the sulphur bath, whereby their temperature is reduced, substantially as herein described.

29. In a match-making machine, the traveling carriers having links provided with pins, the splint-block holders having holes therein for said pins, whereby the holders are advanced, the sulphur-bath pan, into which the splint-blocks are dipped, and the composition-pan into which they are dipped, in combination with the air-cooling pipes under the splint-block holders at a point between the two pans, and the air-cooling pipes above the splint-block holders at a point beyond the composition-pan, substantially as herein described.

30. In a match-making machine, the fixed guides F and the splint-block holders advanced thereon, in combination with independent sections let into said guides and vertically movable, whereby the holders when on said sections are lowered and raised, said sections being movable axially, whereby the splint-block holders may be reversed, substantially as herein described.

31. In a match-making machine, the splint-block holders and the fixed guides F, on which said holders are supported and advanced, said guides having independent vertically-movable sections onto which the holders pass, whereby they may be lowered and raised, in combination with a mechanism for axially rotating said independent sections to turn the holders, substantially as herein described.

32. In a match-making machine, the fixed guides F and the splint-block holders supported and moving thereon, in combination with axially-pivoted independent sections let into said guides and vertically movable, and a mechanism for turning said sections to turn the holders, consisting of a clutch for engaging said sections when lowered, a pinion on the clutch for turning it, and a moving rack engaging the pinion, substantially as herein described.

33. In a match-making machine, the fixed guides F and the match-block holders supported and moving thereon, in combination with the axially-pivoted independent sections let into said guides and vertically movable, a clutch for engaging said sections when lowered, a pinion on the clutch for turning it, a moving rack engaging the pinion, a power-shaft, a cam on said shaft, and intervening connections between said cam and the rack, whereby it is operated, substantially as herein described.

34. In a match-making machine, the fixed guides F and the splint-block holders supported by and moving thereon, in combination with the axially-pivoted vertically-movable independent sections let into said guides and on which the holders are moved, said sections having the lug $f^{10}$, the axially-pivoted channel-guide $n'$, into which the lug passes when the sections are lowered, the pinion $n$ of said guide, and the sliding rack O, engaging the pinion, substantially as herein described.

35. In a match-making machine, the fixed guides F and the holders supported and moving thereon, in combination with the vertically-movable axially-pivoted independent sections let into said guides and onto which the holders are moved, the lug $f^{10}$ of said sections, the rotary channel-guide $n'$, into which the lug passes, the pinion $n$ for rotating said guide, the sliding rack engaging the pinion, the power-shaft V of the machine, a cam on said shaft, and connections between said cam and rack whereby the latter is operated, substantially as herein described.

36. In a match-making machine, the fixed guides F and the match-block holders supported and moving thereon, in combination with the axially-pivoted independent sections let into said guides and upon which the holders are moved, the vertically-movable cross-frame with which said sections are connected, whereby the holders are lowered and raised, the lug $f^{10}$ of said sections, the channel-guide $n'$ below, into which the lug passes, the pinion $n$ for turning the guide, and the sliding rack O, engaging the pinion, substantially as herein described.

37. In a match-making machine, the carriers provided with pins $b^2$, the vertically-movable guide-sections and the match-block holders having holes for said pins, whereby said holders are advanced, in combination with an underlying pan for containing the composition bath, and a vertically-movable shallow trough operating in said pan for raising the liquid into which the match-blocks are dipped, substantially as herein described.

38. In a match-making machine, the vertically-movable guide-sections and the match-block holders thereon, in combination with the vertically-movable frame with which the sections are connected and the rod of said frame, the trough below, the hangers of said trough, and the pivoted levers of said hangers connected with the guide-rod of the frame, whereby as the match-blocks are moved down the trough is moved up to dip the blocks into it, substantially as herein described.

39. In a match-making machine, the vertically-movable guide-sections and the match-block holders supported thereon, the underlying pan for the composition bath, and the independent shallow trough therein, in combination with the means for lowering the match-block holder and raising the trough, consisting of the cross-frame to which the guide-sections are attached, the guide-rod of said frame, the fixed cross-bracket, the levers pivoted to said bracket and connected with the rod of the frame, and the hangers connecting the outer ends of said levers with the shallow trough, substantially as herein described.

40. In a match-making machine, the vertically-movable mechanism for lowering the match-blocks, and the vertically-movable trough into which they are dipped, in combination with an adjustable connection between said trough and the mechanism for lowering the match-blocks, whereby their relative positions may be regulated, substantially as herein described.

41. In a match-making machine, the vertically-movable guide-sections and the match-block holders thereon, the underlying pan and the shallow trough therein, in combination with the cross-frame of the sections having the guide-rod, the fixed bracket of the main frame, the hangers of the trough, the levers connected with the hangers and pivoted to the fixed bracket, and the adjustable connection between the guide-rod and levers, consisting of the nut mounted upon the guide-rod and the side flanges or plates of said nut, to which the levers are pivoted, substantially as herein described.

42. In a match-making machine, the vertically-movable frame by which the match-blocks are carried down to dip them, in combination with the power-shaft V, a cam on said shaft, a pivoted lever against which the cam operates, a link connecting the lever with the vertically-movable frame, and a spring for returning said frame, substantially as herein described.

43. In a match-making machine, the vertically-movable frame for dipping the matches, in combination with a power-shaft, a cam on said shaft, intervening mechanism between the cam and the frame, and the point or projection $m^{10}$ of said cam, whereby the frame is dipped and raised quickly and accurately, substantially as herein described.

44. In a match-making machine, the combination of a carrier having pins on its links, the fixed guides F, the match-block holders having holes for said pins and traveling upon the guides, and the vertically-movable pins $r$, adapted to be brought down upon the match-blocks to discharge them from their holders, substantially as described.

45. In a match-making machine, the socketed holders in which the match-blocks are contained, the fixed guides F, on which said holders are supported by each end, and the carrier by which they are advanced, in combination with the vertically-movable cross-frame Q, having an arm R connected with it and provided with pins $r$, adapted to be brought down upon the match-blocks in their holders, whereby they are forced out, substantially as herein described.

46. In a match-making machine, the traveling socketed match-block holders and the vertically-movable pins by which the match-blocks are discharged, in combination with the inclined chute upon which they are received, and the traveling belt by which they are conveyed away, substantially as herein described.

47. In a match-making machine, the traveling carrier having the pins $b^2$ and the match-block holders mounted upon and advanced by said pins, in combination with the inclined chute at the end of the machine, upon which the holders are received, the cross-belt upon which they are delivered, and the traveling belt by which they are carried to the head of the machine again, substantially as herein described.

In witness whereof we have hereunto set our hands.

GEORGE GRISEL.
FRANK SEVERIO.

Witnesses:
S. H. NOURSE,
H. C. LEE.